United States Patent [19]
Schreiber

[11] 4,037,568
[45] July 26, 1977

[54] EXHAUST HEATED HYDROGEN AND OXYGEN PRODUCING CATALYTIC CONVERTER FOR COMBUSTION ENGINE

[76] Inventor: Edward T. Schreiber, 7400 Lyndale Ave. South, Minneapolis, Minn. 55423

[21] Appl. No.: 567,177

[22] Filed: Apr. 11, 1975

[51] Int. Cl.² .................. F02B 43/08; F02D 19/00
[52] U.S. Cl. .................................. 123/3; 123/1 A; 123/25 J; 123/25 P; 123/DIG. 12
[58] Field of Search ............... 123/1 A, 3, DIG. 12, 123/119 E, 25 J, 25 P, 122 E, 122 AA

[56] References Cited

U.S. PATENT DOCUMENTS

| | | | |
|---|---|---|---|
| 1,452,213 | 4/1923 | Nelson | 123/122 AB |
| 1,471,745 | 10/1923 | Lundgren | 123/122 AA |
| 1,630,048 | 5/1927 | Balachowsky | 123/122 AA |
| 1,784,924 | 12/1930 | Berry | 123/122 E |
| 1,966,345 | 7/1934 | Harrell | 123/121 |
| 2,295,209 | 9/1942 | Guiles et al. | 123/3 X |
| 3,653,364 | 4/1972 | Bogan | 123/119 E |
| 3,828,736 | 8/1974 | Koch | 123/3 |
| 3,939,806 | 2/1976 | Bradley | 123/3 |

*Primary Examiner*—Carroll B. Dority, Jr.
*Assistant Examiner*—William Randolph

*Attorney, Agent, or Firm*—Clarence A. O'Brien; Harvey B. Jacobson

[57] ABSTRACT

A steam generator is provided in operative association with a source of water and the exhaust system of a combustion engine including an air induction system provided with primary fuel inlet structure and supplemental fuel inlet structure. The steam generator derives its heat for converting water into steam from the exhaust system of the combustion engine and the steam generator includes a steam outlet communicated with and opening into one end of an elongated tubular housing disposed in good heat transfer relation with the exhaust system of the combustion engine and having a gas outlet at its other end communicated with the supplemental fuel inlet of the induction system. The tubular housing has iron filings disposed therein and is in such heat transfer relation with the exhaust system of the combustion engine so as to elevate the temperature of steam passing therethrough and to heat the iron filings to the extent that passage of the heated steam over the heated filings will result in hydrogen and oxygen gas being produced in the tubular housing for subsequent passage to the supplemental fuel inlet of the combustion engine induction system.

3 Claims, 2 Drawing Figures

EXHAUST HEATED HYDROGEN AND OXYGEN PRODUCING CATALYTIC CONVERTER FOR COMBUSTION ENGINE

BACKGROUND OF THE INVENTION

Various structures in the form of catalytic converters have been heretofore provided for converting high temperature steam into hydrogen and oxygen gas. However, these previously constructed catalytic converters do not include some of the features of the instant invention whereby a hydrogen and oxygen gas generating catalytic converter may be conveniently operatively associated with a combustion engine in order to generate supplemental fuel for burning in the engine.

SUMMARY OF THE INVENTION

The catalytic converter of the instant invention is specifically constucted for ease in operative association with a conventional vehicle internal combustion engine in a manner such that water converted into steam by utilizing the heat of the exhaust gases from the engine may be broken down, at least to a great extent, into its hydrogen and oxygen components and these components, in gaseous form, may be ducted to the induction system of the combustion engine and utilized as a supplemental fuel therefor.

The main object of this invention is to provide a means whereby the usual maximum power output of a combustion engine may be increased.

Another important object of this invention is to provide an apparatus in accordance with the preceding objects whereby the amount of power developed by the associated combustion engine may be produced partially as a result of the burning of hydrogen and oxygen gases as a supplemental fuel in the engine and with the hydrogen and oxygen gases being produced as a result of converting relatively inexpensive water into its hydrogen and oxygen components.

Still another object of this invention is to provide a converter of the catalytic type and in operative association with the heated exhaust system of a combustion engine in a manner such that water may be readily converted into its hydrogen and oxygen components by an inexpensive method.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully herinafter described and claimed, reference being had to the accompanying drawings forming a part hereof, wherein like numerals refer to like parts throughout.

DETAILED DESCRIPTION OF THE INVENTION

Figure 1:
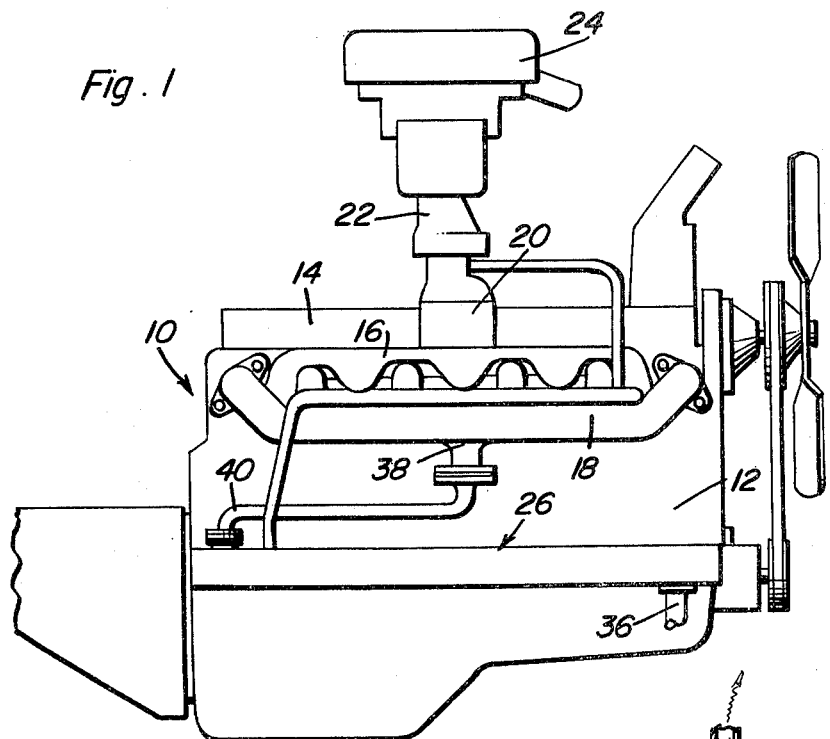
FIG. 1 is a side elevational view of a conventional form of internal combustion engine and with the catalytic converter of the instant invention operatively associated therewith.
Figure 2:
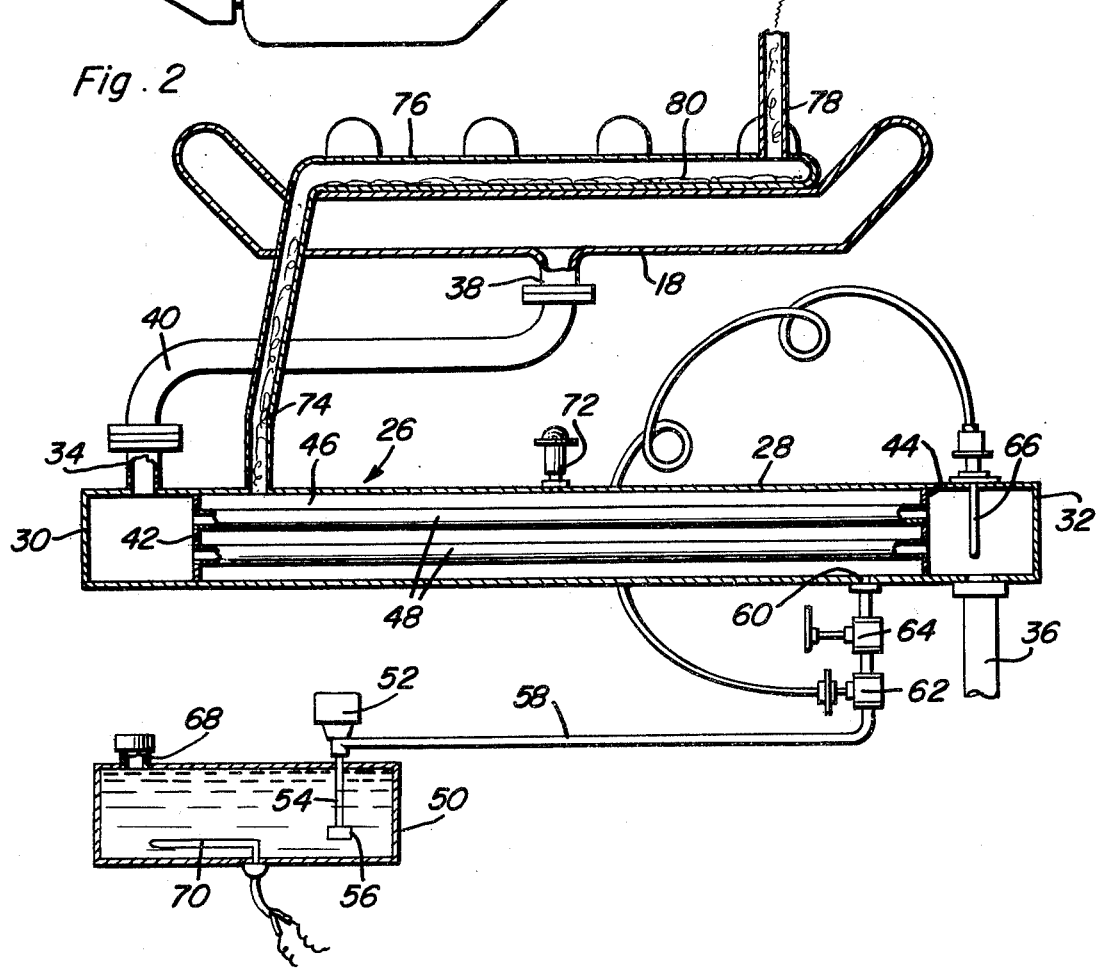
FIG. 2 is a fragmentary enlarged side elevational view of the catalytic converter with portions thereof being broken away and illustrated in vertical section and in operative association with various exhaust system components of the combustion engine.

Referring now more specifically to the drawings, the numeral 10 generally designates a conventional form of motor vehicle internal combustion engine having a block 12, a cylinder head 14 secured over the top of the block and intake and exhaust manifolds 16 and 18. The intake manifold 16 includes an upwardly projecting riser 20 comprising an inlet for the manifold 16 and a conventional carburetor 22 is mounted on top of the riser and has an air cleaner 24 operatively associated with its inlet.

A steam generator referred to in general by the reference numeral 26 is provided and includes an elongated housing 28 closed at its opposite ends as at 30 and 32 and provided with an exhaust gas inlet 34 at one end and an exhaust gas outlet 36 at its other end.

The exhaust manifold 18 includes an outlet neck 38 and the outlet neck 38 is communicated with the inlet 34 by means of an exhaust pipe 40. Further, the interior of the housing 28 includes a pair of opposite end transverse partitions 42 and 44 secured thereacross in positions spaced along the housing 28 toward the longitudinal center thereof from the exhaust inlet 34 and the exhaust outlet 36. The interior of the housing 28 disposed between the partitions 42 and 44 defines a steam chamber 46 and a plurality of tubes 48 extend between and open through the partitions 42 and 44, the ends of the tubes 48 being secured through the partitions in fluid-tight sealed engagement therewith. Accordingly, the tubes 48 communicate the opposite ends of the housing 28 into which the exhaust inlet and exhaust outlet open.

A water supply reservoir 50 is provided and a pump 52 is supported from the reservoir 50. The pump 52 includes an inlet pipe 54 projecting down into the reservoir 50 and provided with a foot valve 56. Further, the pump 52 includes an outlet line 58 opening into the steam chamber 46 as at 60 and the line 58 includes a thermostatically controlled valve 62 as well as a manually controlled valve 64 serially connected therein, the thermostatically controlled valve 62 being thermoresponsive and including a remote temperature sensing actuator 66 disposed in the end of the housing 28 into which the outlet 36 opens.

The reservoir 50 includes a filler neck 68 and an internal heater 70 for heating the water within the reservoir 50 to a point slightly below the boiling point. The heater 70 and the pump 52 are electrically actuated and may receive electrical current from any suitable source of electrical potential (not shown).

The housing 28 includes an excess pressure relief valve 72 for venting the steam chamber 46 and a steam line 74 opens into an upper portion of the steam chamber 46 at its inlet end and into one end of an elongated hollow tubular member 76. The other end of the hollow tubular member 76 has the inlet end of a gas supply line 78 opening thereinto and the outlet end of the gas supply line 78 opens into the interior of the riser 20 below the carburetor 22.

The tubular member 76 extends along the upper surface of the exhaust manifold 18 in good heat transfer relation therewith and has a quantity of iron filings 80 disposed therein.

In operation, the engine 10 is initially started by utilizing the conventional carburetor 22. Then, after the exhaust system of the engine 10 has become heated and the heater 70 within the reservoir 50 has been in operation for a sufficient time to heat the water within the reservoir 50 to a point just below the temperature at which water boils, the pump 52 may be actuated and water is thereby pumped from the reservoir 50 into the steam chamber 26 whereupon the exhaust gases from the manifold 18 passing through the tubes 48 will further heat the water in order to convert the same into steam. The valve 64 remains open at all times except when it is desired to maintain the catalytic converter inoperative and the valve 62 is under the control of the temperature sensing actuator 66 thereof in order to open the valve 62 in response to an increase in temperature and to close the valve 62 in response to a drop in temperature being sensed. As steam is generated in the steam chamber 26 it is vented through the line 74 into the tubular member 76 and is further heated. In addition, the iron filings 80 within the tubular member 76 are highly heated and the passage of steam through the tubular member 76 in intimate contact with the iron filings 80 causes the steam, by catalytic action, to be broken down into its hydrogen and oxygen components. Thereafter, the hydrogen and oxygen components are ducted through the gas supply line 78 and discharged into the induction passages of the engine 10. Of course, the induction of hydrogen, and oxygen gas into the engine 10 will increase its power capacity and also result in a savings of conventional fuel such as gasoline for a given power output.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combustion engine of the type having an air induction system including primary fuel inlet means and an exhaust system for combustion gases, supplemental fuel inlet means for said induction system including steam generator means having a steam outlet, a gas generator housing having a predetermined amount of iron filings disposed therein and fluid inlet and outlet means, means connecting said steam outlet with said fluid inlet means, and means communicating said fluid outlet means with said supplemental fuel inlet means, said exhaust system including portions which are heated to a high degree as a result of operation of said engine, said heated portions of said exhaust system being in good transfer relation with said gas generator housing for heating the internal surfaces thereof and said iron filings, the passage of steam through said housing and in intimate contact with the heated iron filings in said housing serving to further elevate the temperature of said steam and to produce hydrogen and oxygen gas for passage through said housing outlet and to said supplemental fuel inlet means, said exhaust system including an elongated exhaust manifold, said generator housing comprising an elongated tubular member through whose opposite end portions said fluid inlet and outlet means open, said tubular member being disposed in good heat transfer relation with the external surfaces of said exhaust manifold, said steam generator including a horizontally elongated housing provided with a pair of inner transverse partitions spaced from the opposite ends of said steam generator housing and dividing the latter into opposite end chambers and a central disposed between said partitions, a plurality of elongated horizontal heat transfer tubes extending through said central chamber and opening into said end chambers at their opposite ends, the opposite ends of said heat transfer tubes being sealed relative to said partitions, exhaust gas inlet means opening into one of said end chambers, exhaust outlet means opening outwardly of the other of said end chambers, means connecting said exhaust system to said exhaust gas inlet means, said central chamber including an upper outlet comprising said steam outlet and an inlet through which water to be heated into steam may be admitted into said central chamber, water supply means operatively associated with said central chamber inlet for supplying water thereto, said water supply means including heating means operative to heat the water supplied thereby, said water supply means including exhaust gas temperature sensing controlled valve means operative to admit additional quantities of heated water into said water and steam compartment means in response to the temperature of the exhaust gas at said outlet end of said exhaust conduit means being elevated to a predetermined level.

2. The combination of claim 1 wherein said central chamber includes a pressure relief valve controlled vent outlet.

3. In combination with an internal combustion engine of the type having an air induction system including primary fuel inlet means and an exhaust system for combustion gases, supplemental fuel inlet means for said induction system including steam generator means having a steam outlet, a gas generator housing having a predetermined amount of iron filings disposed therein and fluid inlet and outlet means, means connecting said steam outlet with said fluid inlet means, and means communicating said fluid outlet means with said supplemental fuel inlet means, said exhaust system including portions which are heated to a high degree as a result of operation of said engine, said heated portions of said exhaust system being in good transfer relation with said gas generator housing for heating the internal surfaces thereof and said iron filings, the passage of steam through said housing and in intimate contact with the heated iron filings in said housing serving to further elevate the temperture of said steam and to produce hydrogen and oxygen gas for passage through said housing outlet and to said supplemental fuel inlet means, said steam generator including a horizontally elongated housing provided with a pair of inner transverse partitions spaced from the opposite ends of said steam generator housing and dividing the latter into opposite end chambers and a central chamber disposed between said partitions, a plurality of elongated horizontal heat transfer tubes extending through said central chamber and opening into said end chambers at their opposite ends, the opposite ends of said heat transfer tubes being sealed relatively to said partitions, exhaust gas inlet means opening into one of said end chambers, exhaust outlet means opening outwardly of the other of said end chambers, means connecting said exhaust system to said exhaust gas inlet means, said central chamber including an upper outlet comprising said steam outlet and an inlet through which water to be heated into steam may be admitted into said central chamber, water supply means operatively associated with said central chamber inlet for supplying water thereto, said water supply means including heating means operative to heat the water supplied thereby, said water supply means including exhaust gas temperature sensing controlled valve means operative to admit additional quantities of heated water into said water and steam compartment means in response to the temperature of the exhaust gas at said outlet end of said exhaust conduit means being elevated to a predetermined level.

* * * * *